(12) United States Patent
Battle

(10) Patent No.: US 6,417,848 B1
(45) Date of Patent: Jul. 9, 2002

(54) PIXEL CLUSTERING FOR IMPROVED GRAPHICS THROUGHPUT

(75) Inventor: James T. Battle, San Jose, CA (US)

(73) Assignee: ATI International SRL, Thornhill (CA)

(*) Notice: Subject to any disclaimer, the term of this patent is extended or adjusted under 35 U.S.C. 154(b) by 0 days.

(21) Appl. No.: 08/918,276

(22) Filed: Aug. 25, 1997

(51) Int. Cl.⁷ .............................................. G06T 17/00
(52) U.S. Cl. ..................................... 345/419; 345/422
(58) Field of Search ............................... 345/422, 431, 345/423, 506, 430, 419

(56) References Cited

U.S. PATENT DOCUMENTS

| | | | |
|---|---|---|---|
| 5,307,450 A | | 4/1994 | Grossman .................... 395/123 |
| 5,420,966 A | * | 5/1995 | Silverbrook ................ 345/422 |
| 5,513,366 A | * | 4/1996 | Agarwal et al. ............ 395/800 |
| 5,758,120 A | | 5/1998 | Kahle et al. ................. 395/477 |
| 5,764,243 A | * | 6/1998 | Baldwin ...................... 345/506 |
| 5,764,787 A | * | 6/1998 | Nickerson ................... 382/107 |
| 5,767,856 A | * | 6/1998 | Peterson et al. ............ 345/422 |
| 5,767,858 A | * | 6/1998 | Kawase et al. ............. 345/430 |
| 5,821,950 A | * | 10/1998 | Rentschler et al. ......... 345/505 |
| 5,828,378 A | * | 10/1998 | Shiraishi ...................... 345/422 |
| 6,002,407 A | * | 10/1998 | Fadden ....................... 345/430 |
| 5,864,342 A | * | 1/1999 | Kajiya et al. ................ 345/418 |
| 5,886,701 A | * | 3/1999 | Chauvin et al. ............ 345/418 |
| 5,940,086 A | * | 8/1999 | Rentschler et al. ......... 345/503 |
| 5,966,528 A | * | 10/1999 | Wilkinson et al. .......... 395/563 |

FOREIGN PATENT DOCUMENTS

| | | | |
|---|---|---|---|
| EP | 0 403 054 | 12/1990 | ............ G06F/15/72 |
| EP | 0 627 700 | 12/1994 | ............ G06F/15/72 |
| GB | 2336086 | * 10/1999 | ............. G06T/1/60 |
| JP | 408161509 A | * 10/1999 | ............ G06T/11/00 |
| WO | 97/08656 | 3/1997 | ............ G06T/13/00 |

OTHER PUBLICATIONS

B. S. Borden: "Graphics Processing on a Graphics Supercomputer" IEEE Computer Graphics and Applications, vol. 9, No. 4, Jul. 1, 1989, pp. 56–62, XP000115866.
Qiwen Zhang et al.: "A Clustering Algorithm for Data–Sets with a Large Number of Classes" Pattern Recognition, vol. 24, No. 4, Jan. 1, 1991, pp. 331–340, XP000205305.
C. Renaud et al.: "Fast massively parallel progressive radiosity on the MP–1" Parallel Computing, Jul. 1997, Elsevier, Netherlands, vol. 23, No. 7, pp. 899–913, XP002097123.
IBM TDB, Color Graphics Picture Segmentation, vol. 32, issue 3B, pp. 384–387, Aug. 1989.*

* cited by examiner

Primary Examiner—Cliff N. Vo
(74) Attorney, Agent, or Firm—Skjerven Morrill MacPherson LLP; Edward C. Kwok

(57) ABSTRACT

A 3-D graphics system combines a software programmed setup processor, a 3-D pipeline, and a software programmed back end processor. The setup processor performs "setup" on polygons for the 3-D pipeline. The 3-D pipeline rasterizes the polygons to create pixels. The back end processor performs back end processing, such as Z-buffering and alpha blending on the pixels. In one embodiment, the throughput of the 3-D graphics system is increased by clusterizing the pixels before back end processing. Specifically, a clusterizer combines pixels into clusters that can be processed by the back end processors without data coherency problems. Furthermore, the pixels are selected for a cluster to minimize memory latency and access times. In some embodiments, clusters are filled with fill addresses by a cluster filler. The filled addresses generated by the cluster filler, do not cause potential hazards in the back end processor.

25 Claims, 11 Drawing Sheets

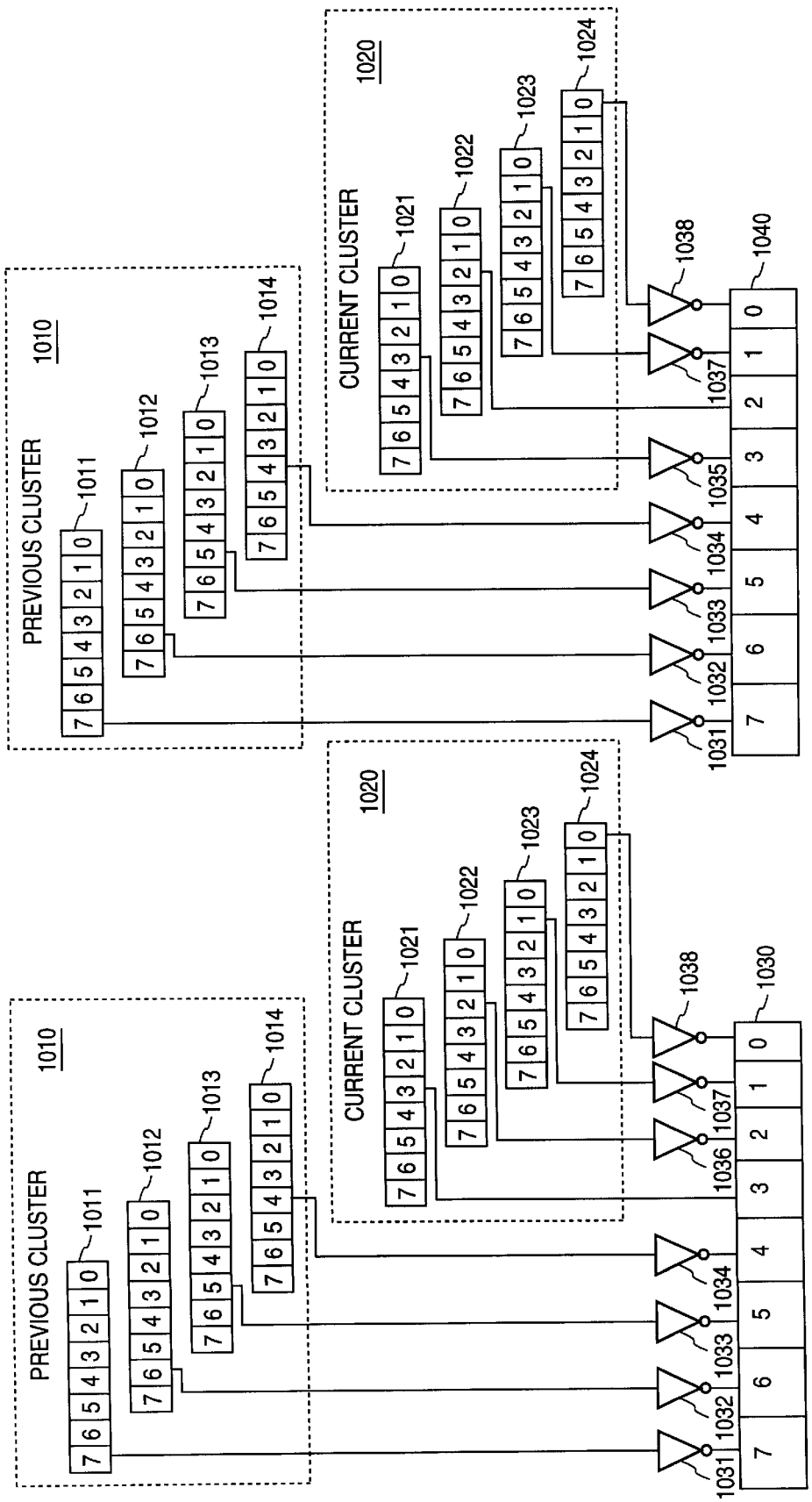

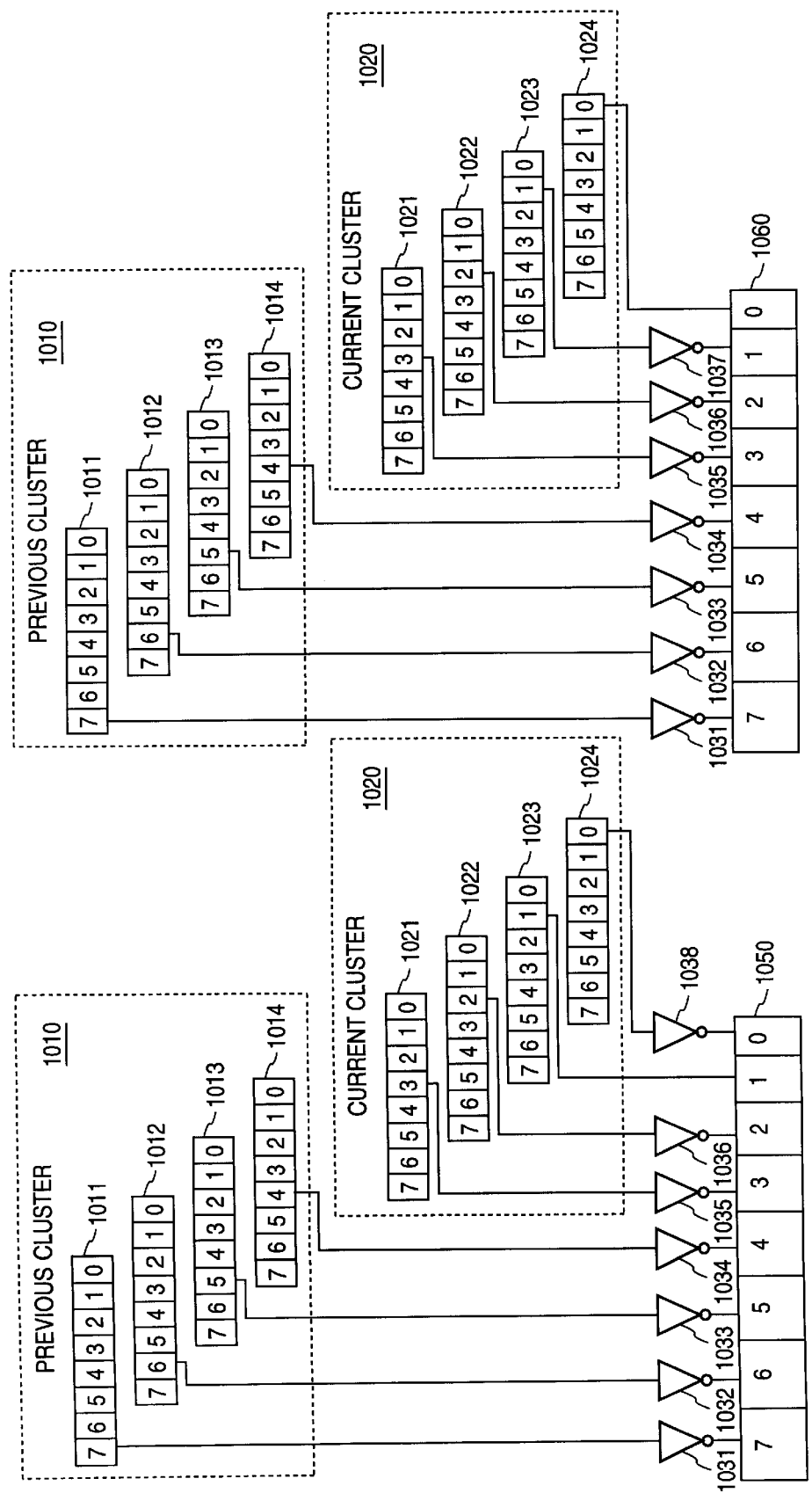

PIXEL CLUSTERING FOR IMPROVED GRAPHICS THROUGHPUT

BACKGROUND OF THE INVENTION

1. Field of the Invention

The present invention relates to computer-generated 3-D graphics. In particular, the present invention relates to the architecture of a media processor, which combines a programmable processor with dedicated hardware to process 3-D images represented by polygons.

2. Discussion of the Related Art

In computer graphics, the surfaces of 3-D objects are approximated using polygons (typically triangles). Using smaller polygons creates more realistic 3-D objects on the computer screens. However, using smaller polygons requires a larger number of polygons to represent an object.

Surfaces of objects and the polygons representing the surfaces are provided in a three dimensional coordinate system, typically referred to as "object space" $O(x, y, z)$. However, graphical displays used with computers and consumer video equipment are only two dimensional. Therefore, an image of the objects is displayed on a graphical display by projecting the object onto a two-dimensional coordinate system, typically referred to as "screen space" $S(x, y)$.

Generally, a polygon can be described by the polygon's vertices. Typically the description of a vertex includes the coordinates of the vertex in object space, i.e. $(x, y, z)$; perspective projection parameters $(w, s, t)$; the color of the vertex, typically using color space coordinates $(r, g, b)$; an alpha parameter; and a fog parameter. The vertex information is processed through well known setup processes into a parameter list suitable for a 3-D pipeline. The exact parameter list format depends on the 3-D pipeline used.

The 3-D pipeline performs rasterization of the polygons, i.e. the conversion of polygons into pixels in object space. A common rasterization algorithm for polygons includes four major steps: walk edges, walk spans, texture pixels, and apply fog effects. Many elements of the theory and techniques of rasterization are known to those skilled in the art.

Texturing pixels is a technique for mapping an image ("texture") onto the polygonal surfaces of a computer-generated object, so as to allow the object to appear more realistic in a displayed scene. Texture mapping allows a texture to be superimposed onto each polygon of an object, using transformation techniques that compensate the appearance of the texture in each polygon for lighting conditions, angles of viewing and other conditions which may affect the appearance of the object. Many elements of the theory and techniques of texture mapping are known to those skilled in the art.

As object space pixels are generated by rasterization, the object space pixels are blended in a blender or back end processor to create 2-D images suitable for graphic displays. Specifically, the blender or back end processor performs Z-buffering and alpha blending on the object space pixels. Z-Buffering determines which object space pixels can be seen on the graphics screen. Specifically, Z-buffering compares the z coordinate each object space pixel against the z coordinate of the screen space pixel with the same x and y coordinates in the frame buffer. If the object space pixel is in front of the frame buffer pixel the parameters of the object space pixel is stored in the frame buffer otherwise the contents of the frame buffer remain unchanged. The frame buffer is typically addressed by mapping the x and y coordinates of a pixel into a memory address. The frame buffer stores parameters regarding the pixel such as color space values and the Z coordinate. Alpha blending controls the translucence of the conversion from object space to screen space. The screen space pixels are stored in a frame buffer for displaying on a graphics display. Many elements of the theory and techniques of Z-buffering and alpha blending are known to those skilled in the art.

For realistic 3-D graphics, a 3-D image probably includes thousands of polygons for real-time application or even millions of polygons for high-resolution 3-D images. The setup procedure for these polygons can be performed on a programmable processor. However many 3-D graphics systems use dedicated hardware for the setup procedure. Most 3-D graphics system uses dedicated hardware to perform rasterization. Rasterization generates about 50 pixels for small polygons used in detailed 3-D graphics and about 400 pixels for polygons in used for 3-D games. Therefore, a rasterization of a high quality 3-D image may generate over a million pixels in object space. Consequently, back end processors which perform Z-buffering and alpha blending are implemented using dedicated hardware which must be coupled to the frame buffer. Many 3-D graphic system combine the functions of the back end processor with the 3-D pipeline.

Thus 3-D image processing typically involves one or more fast processing units in conjunction with a dedicated 3-D pipeline and a large amount of memory for image data and intermediate results. As can be seen from the description above, setup, rasterization, and blending are both computational and memory intensive. Since many features of the 3-D pipeline and back end processor require complex computation, the 3-D pipelines and back end processors require many transistors to implement and consequently consume a large area on integrated circuits. Furthermore, direct hardware implementations of algorithms can not be easily changed to take advantage of new algorithms or new techniques. Hence, there is a need for architectures and methods which allow parts of the 3-D pipeline and blender to be implemented using programmable processors.

SUMMARY OF THE INVENTION

The present invention provides a 3-D graphics system which provides high performance and flexibility. In one embodiment, the 3-D graphics system includes a software programmed setup processor, a 3-D pipeline, and a software programmed back end processor. The software programmed setup processor performs "setup" on polygons. The 3-D pipeline rasterizes the polygons into pixels which undergo back end processing, such as Z-buffering and alpha blending, in the software programmed setup processor. Using a software programmed back end processor allows the 3-D graphic system to be adapted with new algorithms for back end processing and adapted to perform other types of processing in addition to standard back end processing.

To increase the throughput on some embodiments of the 3-D graphics system, the setup processor and the back end processor are implemented as SIMD vector processors. In one embodiment the setup processor and the back end processor are both programmed on one SIMD vector processor.

To further increase the throughput of the 3-D graphic system, some embodiments of the invention includes a clusterizer to eliminate potential hazards for the SIMD vector processor. The clusterizer combines pixels into clusters which have no potential hazards for the back end processor. The clusterizer also eliminates potential hazards between clusters which may be interleaved by the back end processor. Thus, the back end processor can process the clusters from the clusterizer without wasting processing cycles resolving data coherence issues. Furthermore, the clusterizer can create clusters in which all pixel in the cluster are on the same page of a memory to reduce memory access times and latencies.

In one embodiment of the clusterizer, the clusterizer builds clusters one pixel at a time. The clusterizer checks for potential hazards between the current cluster and the current pixel as well as between the current pixel and previous clusters. If no potential hazard exists and the current pixel is on the same page of memory as the other pixels in the current cluster, the clusterizer adds the current pixel to the current cluster. Otherwise the clusterizer outputs the current cluster, possibly one or more null clusters, and starts a new cluster with the current pixel.

In some embodiment of the clusterizer, clusters are fixed size. Therefore, if a potential hazard or problem prevents the current pixel from being placed in the current cluster, the current cluster must be outputted before it is full. However, some embodiments of the clusterizer includes a cluster filler which fills the cluster with addresses that do not cause potential hazards for the back end processor.

The present invention is better understood upon consideration of the detailed description below and the accompanying drawings.

BRIEF DESCRIPTION OF THE DRAWINGS

FIGS. 10(a)–10(d) are circuits to create unique group addresses in accordance with one embodiment of the present invention.

DETAILED DESCRIPTION OF THE PREFERRED EMBODIMENTS

Figure 1:
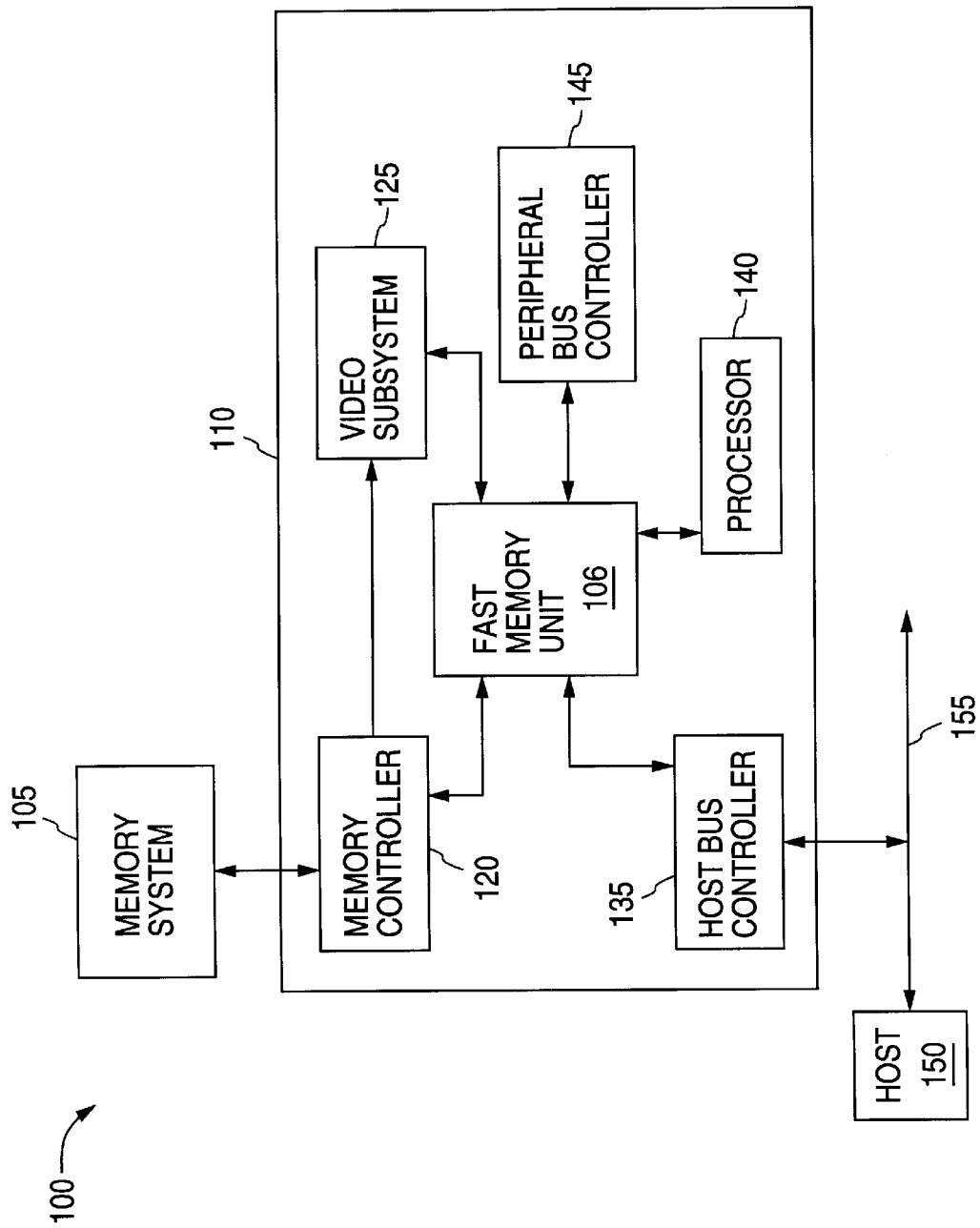
FIG. 1 shows a computer system 100 to which one embodiment of the present invention is applicable.

FIG. 1 shows a computer system 100 to which one embodiment of the present invention is applicable. In computer system 100, a media processor 110 accesses a memory system 105, which includes a frame buffer as well as program memory. Media processor 110 typically operates under control of a host 150 and interfaces with a number of multimedia peripherals. For example, FIG. 1 shows media processor 110 includes (a) a video subsystem 125 for interfacing with various video and graphics displays (b) a peripheral bus controller 145 to interface peripherals implemented on media processor 110 such as modems and audio equipment to other systems, and (c) a host bus controller 135 to communicate with devices on host bus 155, such as host 150.

Media processor 110 includes a processor 140, which may include a 3-D pipeline and a programmable processing unit. A fast memory unit 106 is used as an instruction cache, a data cache and a texture cache for memory system 105. A texture cache architecture suitable for media processor 110 is described in U.S. patent application Ser. No. 08/918,226 entitled "Reconfigureable Texture Cache," naming James T. Battle as inventor, assigned to the assignee of this application and filed on even date herewith with Attorney Docket No. M-5120 US, which is hereby incorporated by reference in its entirety.

Figure 2:
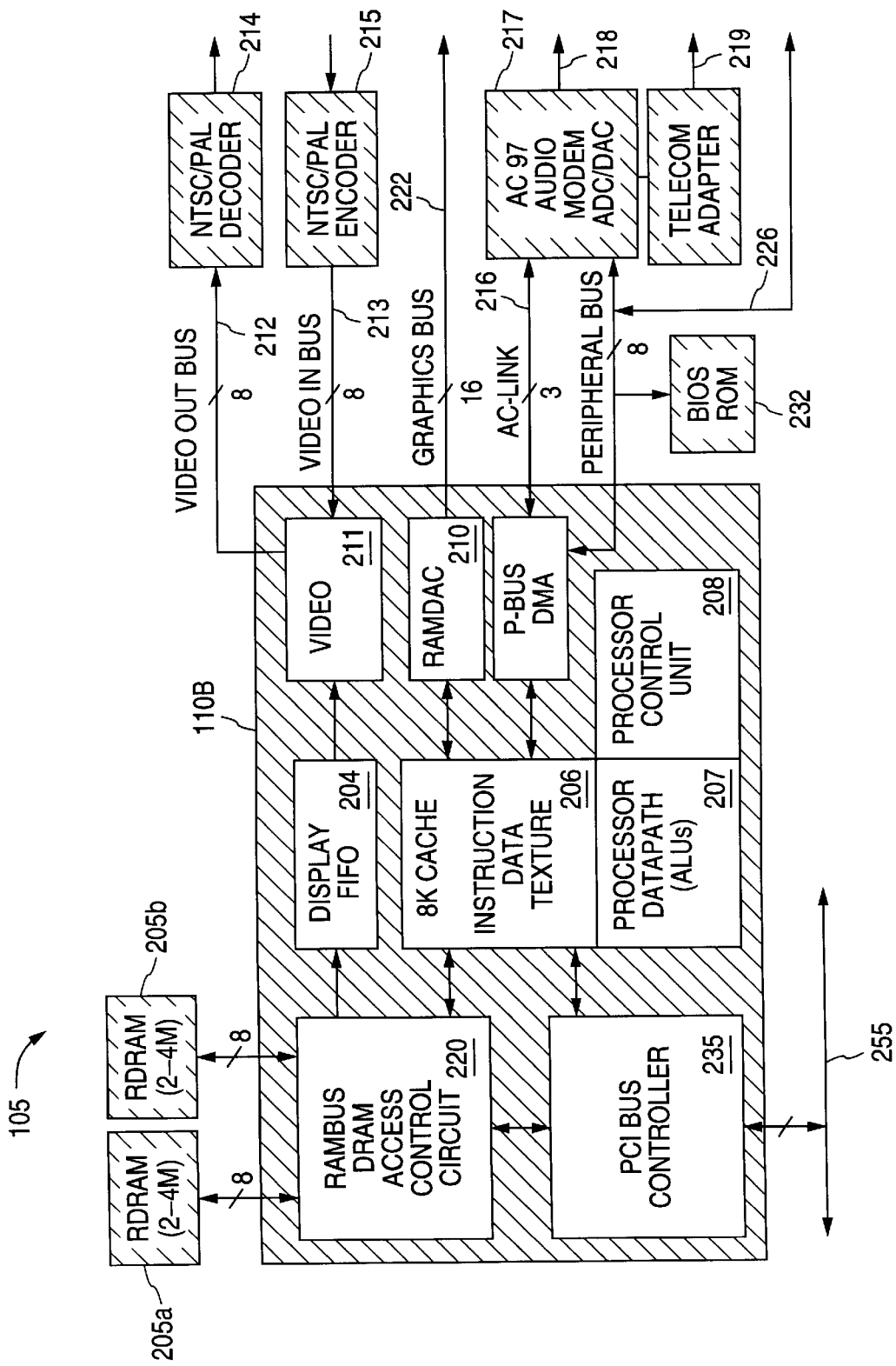
FIG. 2 shows a second embodiment of computer system to which one embodiment of the present invention is applicable.

FIG. 2 shows a media processor 110B, which is a specific embodiment of media processor 110, coupled to various peripheral components and video equipment. Media processor 110B is implemented as a single chip. Memory system 105 includes two Rambus memory banks 205a and 205b. To access Rambus memory banks 205a and 205b, memory controller 120 becomes a Rambus memory access control circuit 220, which design is provided by Rambus, Inc. of Mountain View, Calif. Media processor 110B uses a PCI bus 255 under control of PCI bus controller 235, in place of generic host bus controller 135. Video subsystem 125 is expanded to include (a) an on-chip video controller 211 providing an 8-bit digital video signal on video output bus 212 and receiving an 8-bit digital video signal on video input bus 213, and (b) an on-chip RAMDAC unit 110 interfacing with a 16-bit graphics output bus, which drives an external graphics display terminal over graphics bus 222. As shown in FIG. 2, the 8-bit video signals of video input bus 213 and video output bus 212 are respectively encoded and decoded by NTSC/PAL encoder 215 and NTSC/PAL decoder 214.

In addition, FIG. 2 shows media processor 110B interfacing through on-chip peripheral bus controller 145 to (a) a 3-terminal analog interface 216 and (b) an 8-bit peripheral interface 221. As shown in FIG. 2, a peripheral control unit 217 is coupled to analog bus 221 and analog interface 216 to provide multichannel audio signals, a modem, and other applications.

Processor 140 includes a processor control unit 208 and a processor datapath 207, which includes multi-stage pipelined arithmetic logic units. Fast memory unit 106 in media processor 110B is a static random access memory (SRAM) unit 206, which provides a total of 8K bytes of memory for use as an instruction cache, a data cache and a texture cache.

Figure 3:
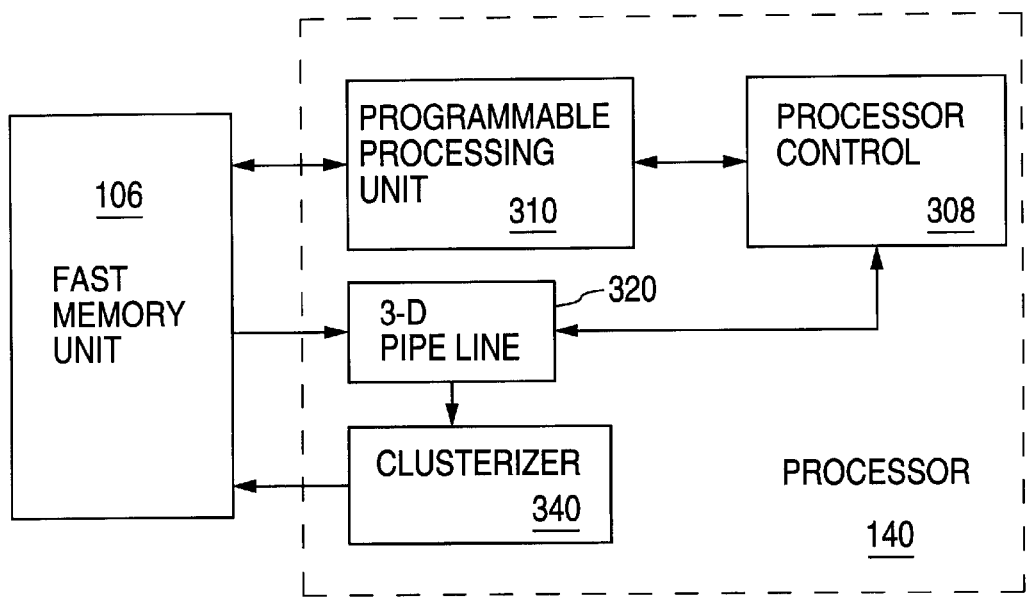
FIG. 3 shows a block diagram of a processor in accordance with one embodiment of the present invention for processing 3-D graphics.

FIG. 3 provides a block diagram of one embodiment of processor 140 with fast memory unit 106. Specifically, processor 140 includes a programmable processing unit 310, a 3-D pipeline 320, and a clusterizer 340. Programmable processing unit 310, 3-D pipeline 320, and clusterizer 340 are coupled to fast memory unit 106. To improve access to fast memory unit 106, some embodiments of fast memory unit 106 are multiported so programmable processing unit 310, 3-D pipeline 320, and clusterizer 340 can access fast memory unit 106 simultaneously. In one embodiment, programmable processing unit 310 is a vector signal processor (VSP) and includes multiple arithmetic logic units which work in parallel as a SIMD (Single instruction multiple data) processor.

3-D pipeline 320 performs rasterization on polygons. In one embodiment 3-D pipeline 320 includes thirty stages to perform rasterization. The first three stages receive the polygons into 3-D pipeline 320. The next three stages generate spans for the polygons. The next three stages generate pixels from the spans of the polygon. Ten stages are then used to apply perspective to the pixels. The next three stages generate texture addresses for a texture cache. Two more stages are used to access the texture cache and format texels from the texture cache. The next two stages apply various filters to the texels as needed. Then two stages blend and modulate the pixels and texels. Diffusion and specular lighting effects may also be applied. The final two stages apply fog effects to the pixels.

Clusterizer 340 groups pixels into clusters to facilitate back end processing. Clusters are data structures that groups pixels in format ideal for vector SIMD operations. Furthermore, clusters can be customized to avoid some latencies of memory system 105. For example, clusters might be configured to only include pixels on the same "page" of memory in memory system 105. A cluster format in accordance with one embodiment of the invention is described in detail below. In one embodiment of processor datapath 107, clusterizer 340 is a five stage pipeline which is combined with 3-D pipeline 320 to form a 35 stage 3-D pipeline.

Figure 4:
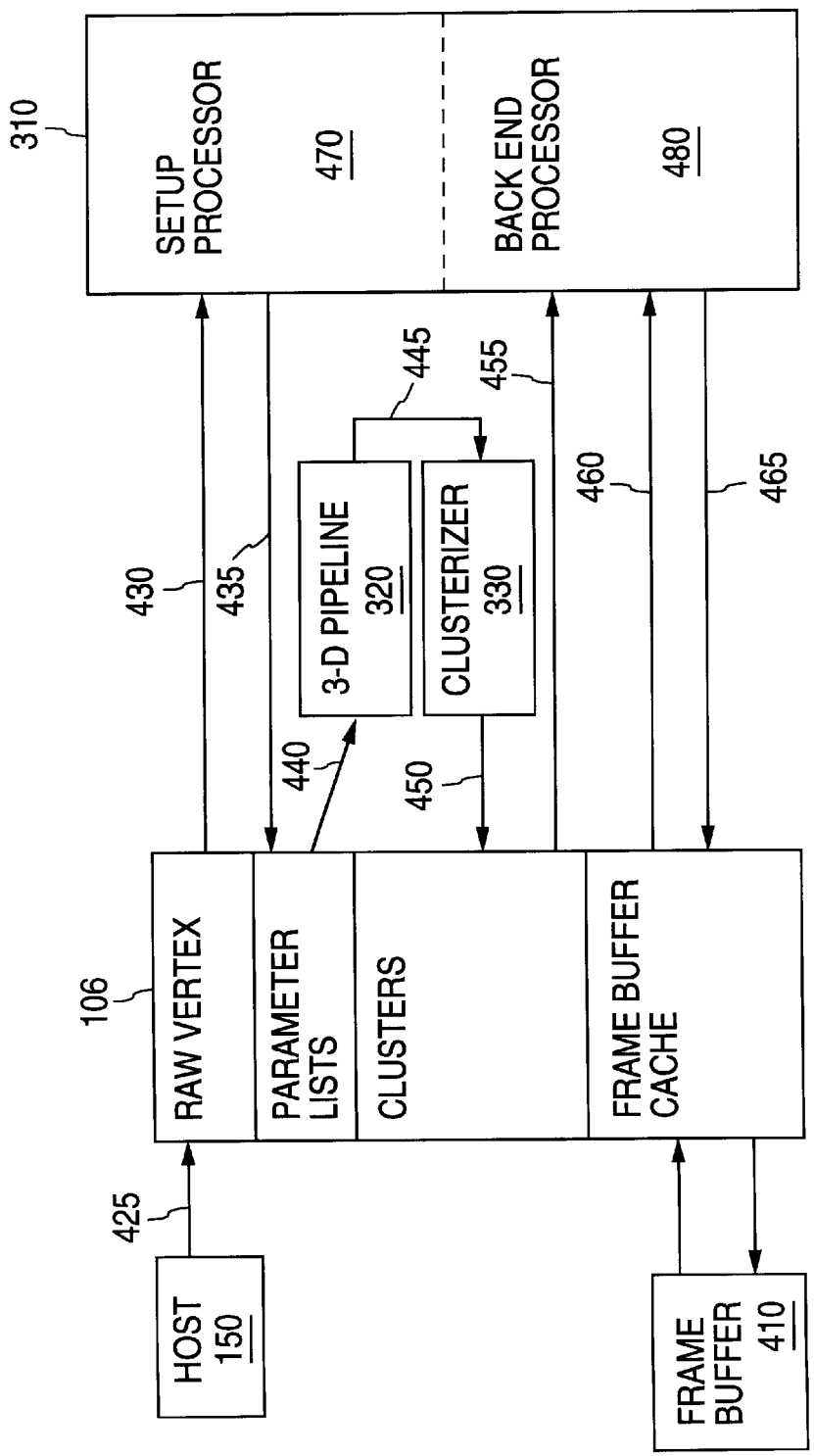
FIG. 4 shows a data flow diagram for processing 3-D graphics by one embodiment of the present invention.

Unlike conventional 3-D graphics system, media processor 110 does not require dedicated hardware to perform back end processing. Programmable processing unit 310 performs both setup and back end processing, while 3-D pipeline 320 performs rasterization. FIG. 4 conceptually illustrates the interaction of fast memory unit 106, programmable processing unit 310, 3-D pipeline 320, and clusterizer 340. In FIG. 4, arrows denote data transfers rather than connection between devices. Furthermore, fast memory unit 106 is shown to be segmented by data types which does not necessarily reflect actual use of fast memory unit 106. In addition as shown in FIG. 4, programmable processor 310 can be conceptually split into a software programmed setup processor 470 for performing setup and a software programmed back end processor 480 for performing Z-buffering and alpha blending.

Host 150 provides polygon information in the form of raw vertex information to fast memory unit 106 at data transfer 425. Programmable processing unit 310 reads the raw vertex information from fast memory unit 106 via data transfer 430. After converting the raw vertex information to a parameter list suitable for 3-D pipeline 320, programmable processing unit 310 writes the parameter list into fast memory unit 106 via data transfer 435.

3-D pipeline 320 reads the parameter lists from fast memory unit 106 via data transfer 440 and rasterizes the parameter lists to generate raw pixels. The raw pixels are sent to clusterizer 340 via data transfer 445. Clusterizer 340 forms clusters (as described below) from the raw pixels and stores the clusters in fast memory unit 106 via data transfer 450. Programmable processing unit 310 retrieves the clusters from fast memory unit 106 via data transfer 455. Programmable processing unit 310 also retrieves pixels from frame buffer 410, which is part of memory system 105, through fast memory unit 106, which acts as a frame buffer cache, via data transfer 460. After performing Z-buffering and alpha blending, programmable processing unit 310 writes pixel information back to frame buffer 106 through fast memory unit 106 via data transfer 465.

As explained above, conventional 3-D graphics system use dedicated hardware to perform Z-buffering and alpha blending. The ability of Media processor 110 to perform Z-buffering and alpha blending in a programmable processing unit is due in part to clusterization of the pixels after rasterization of the polygons by 3-D pipeline 320. In general terms, clusterizer 340 forms clusters of pixels which are suitable for rapid processing by programmable processing unit 310. Pixels in a cluster share certain attributes including (a) the pixels can be retrieved from frame buffer 410 rapidly, (b) the pixels have the same control parameters for back end processing, and (c) the pixels do not cause coherency problems during Z-buffering or alpha blending. Clusterizer 340 can also be used with hardware implementations of Z-buffering and alpha blending.

Most large memory systems use dynamic random access memories (DRAMs) to reduce the cost of the memory systems. As is well known in the art, many fast DRAMs, such as fast page mode DRAMs and Rambus DRAMs (RDRAMs), use pages in the memory chips. Accessing data stored in one page of a DRAM is significantly faster than accessing data stored on two pages of a DRAM. Therefore, to insure fast access to pixels in a cluster from memory system 105, every pixel in a cluster should be on the same page of memory.

Although rasterization returns pixels, the pixels from 3-D pipeline 320 still exhibit 2-D locality in display space. The 2-D locality can be attributed to the 2-D locality in the original polygons used to generate the pixels. Therefore, the pages of memory system 105 should be mapped into two dimensional "tile" in screen space to improve clusterization of the pixels.

Figure 5:
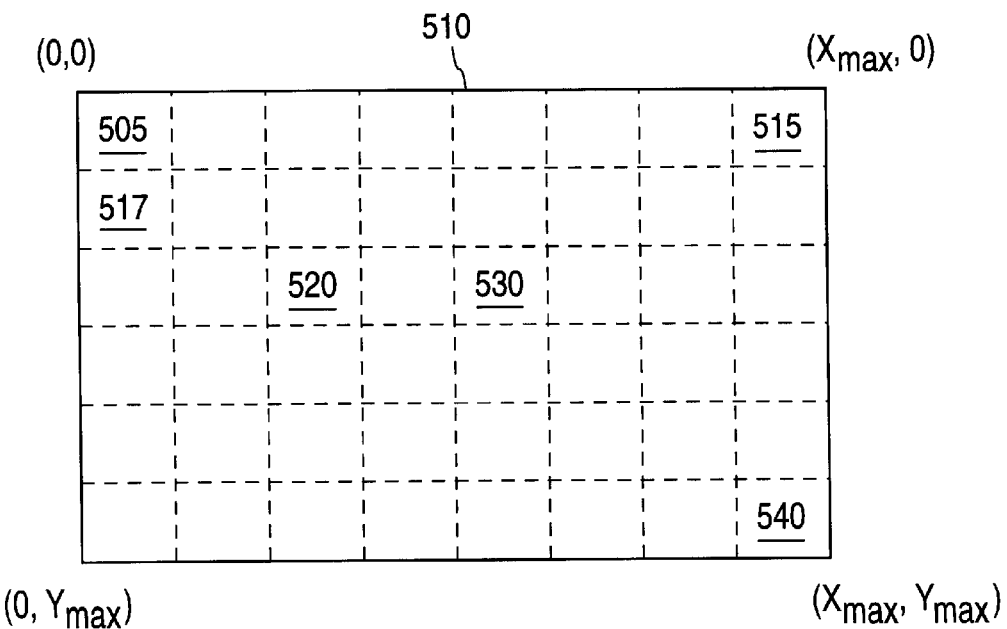
FIG. 5 shows a graphics display for use with embodiments of the present invention.

FIG. 5, shows a common mapping of memory pages to a rectangular graphics display screen 510. Graphic display screen 510 is typically addressed with an x coordinate and a y coordinate in the form (x,y). The top left corner is typically assigned address (0,0) and the bottom right corner is assigned address ($x_{max}$, $y_{max}$) Consequently, the top right corner is assigned address ($x_{max}$, 0) and the bottom left corner is assigned address (0, $y_{max}$), A memory page of memory system 105 is mapped to each of the dotted rectangles tiles, such as tiles 520, 530, and 540. Thus every pixel in one of the tiles is in the same memory page of memory system 105. Since every pixel in a cluster are stored in the same memory page, every pixel in a cluster is also located in the same tile of display screen 510. Other tile shapes such as triangles and hexagons may also be used.

Since memory systems 105 is typically addressed using a memory address, the (x,y) addressing scheme used for graphics display 510 must be converted to a memory address. Memory addresses in memory system 105 can be in the form: base address+an offset. Memory addresses in frame buffer 410 can be defined by just the offset if the base address is assumed to be the start of the frame buffer in memory system 105. The offset for frame buffer 410 can be split into a page address+a pixel/group offset. The page address corresponds to the address of the start of a page and the pixel/group address defines a pixel or group of pixels in the page. Thus the page address of the memory page corresponding to tile 505 is equal to zero. Typically, the page address increases left to right and top to bottom. The page address corresponding to tile 540 is greater than the page address corresponding to tile 517 which is greater than the page address of tile 515 which is greater than the page address corresponding to tile 505. Similarly, pixel/group addresses increase from left to right and top to bottom.

If a data word of frame buffer 410 contains $P_{dw}$ pixels, each tile is $T_x$ pixels wide, and each tile is $T_y$ pixels high then a memory page contains PS (page size) data words where:

$$PS = \frac{T_x}{P_{dw}} * T_y. \quad (1)$$

Thus, the page address corresponding to tile 515 is 7*PS; the page address corresponding to tile 517 is 8*PS; and the page address corresponding to tile 540 is 47*PS.

Equation (2) calculates the page address, PA, from a pixel address (x,y), where $T_{sx}$ is the number of tiles across a graphics display.

$$PA = PS * \left\{ \text{int}\left(\frac{x}{T_x}\right) + T_{Sx} * \text{int}\left(\frac{y}{T_y}\right) \right\} \quad (2)$$

Equation (3) calculates the pixel/group addresses, PGO, from a pixel address (x,y)

$$PGO = \text{int}\left(\frac{x \bmod T_x}{P_{dw}}\right) + \left((y \bmod T_y) * \frac{T_x}{P_{dw}}\right) \quad (3)$$

Typically, clusters store the page address, PA, of all the pixels in the cluster and the pixel/group addresses, PGO, of each pixel or group in the cluster. The pixel location of the pixel within the group, $P_{loc}$, is equal to x mod $P_{dw}$.

For purely 2-D graphics frame buffer 410 only needs to store the color space information of a pixel. However, for 3-D graphics frame buffer 410 must store both the color space information of each pixel and the Z coordinate of each pixel. Typically frame buffer 410 stores the Z coordinates together in one section of memory and the color space information in another section of memory. Graphics display 510 is tiled with both a color space tile system and a z-coordinate tile system. Since the number of bits required for color space information may differ from the number of bits required for the Z coordinate, the size of pixel groups for color space may differ from the size of pixel groups for Z coordinates. Furthermore, the size of color space tiles may be different than the size of Z-coordinate tiles. The memory page address and pixel/group address for color space can be computed using equations (1), (2), and (3) using the appropriate size information for color space.

Since clusterization of pixels is designed to improve SIMD processing of the pixels, all the pixels in a cluster are processed identically. Therefore, pixels requiring different processing by programmable processing unit 310 should reside in different clusters. Typically, pixels from 3-D pipeline 320 describe functions to be performed by programmable processing unit 310 using certain control parameters. Thus, clusterizer 340 must insure that a single cluster contains only pixels with the same control parameters.

A cluster of pixels is to be processed using software in programmable processing unit 310. Since software solutions are much slower than dedicated hardware, clusterizer 340 should create clusters which are free from processing hazards such as write-after-write hazards and read-before-write hazards. The specific types of hazards that must be avoided depend on the specific implementation of clusterizer 340, and the implementation of the back end processing.

The general Z-buffering algorithm, for a pixel described located in object space by coordinates $(X_p, Y_p, Z_p)$ and having color space parameters $RGB_p$, to be placed in the frame buffer is shown in Table 1:

TABLE 1

$Z_{old} = Z_{fb}(X_p, Y_p)$, the Z value from the frame buffer at location $X_p, Y_p$;
If $Zp < Z_{old}$ then $Z_{fb}(X_p, Y_p) = Z_p$
$RGB_{fb}(X_p, Y_p) = RBG_p$ A hazard which is common to almost all implementations of clusterizer 340 for SIMD versions of the Z-buffering algorithms is having two overlapping pixels in a cluster. Overlapping pixels in object space have the same x coordinates and the same y coordinates. Since a SIMD Z-buffering algorithm performs Z-buffering on both pixels simultaneously, an incorrect $Z_{fb}(x,y)$ and $RGB_{fb}(x, y)$ may result depending on which pixel is written into the frame buffer last.

Figure 6:
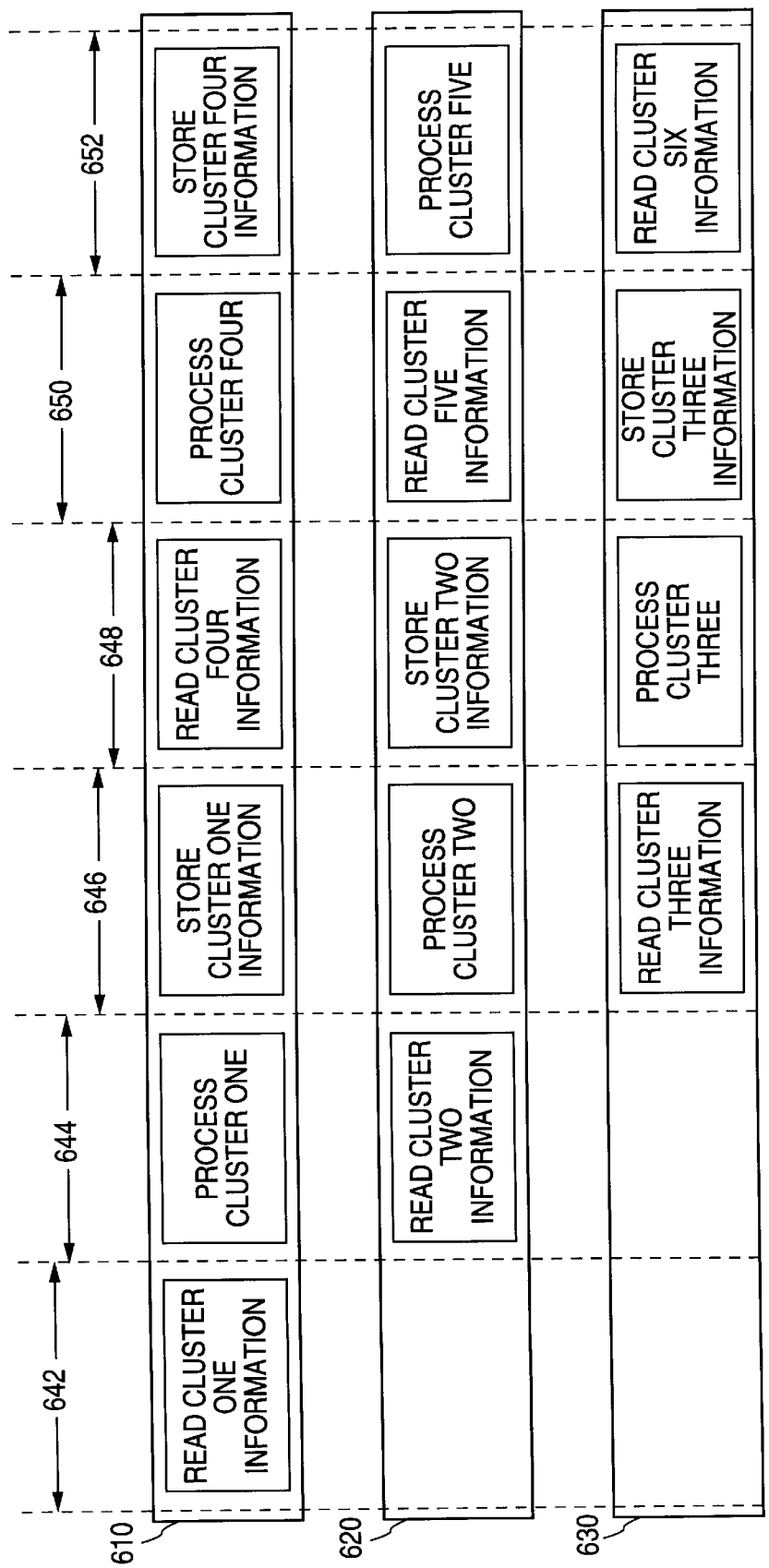
FIG. 6 shows three pipelines for back end processing of clusters in accordance with one embodiment of the present invention.

For embodiments of the invention which pipeline cluster processing by interleaving clusters, intercluster hazards may also occur. An intercluster hazard due to interleaved clusters is illustrated in FIG. 6. In the embodiment illustrated by FIG. 6, back end processing are performed with pipeline 610, pipeline 620, and pipeline 630. Pipelines 610, 620, and 630 may be actual physical pipelines in hardware back end processor are software constructs in software programmed back end processor 480 (FIG. 4). In time interval 642, pipeline 610 reads cluster one information from fast memory unit 106 (see FIG. 4). Reading cluster information as used with respect to FIG. 6 includes reading the cluster pixels as well as reading the corresponding information in frame buffer 410. In time interval 644, which follows time interval 642, pipeline 610 processes cluster one and pipeline 620 reads cluster two information from fast memory unit 106. In time interval 646 pipeline 610 finally stores cluster one information; pipeline 620 processes cluster two, and pipeline 630 reads cluster three information. Storing cluster information as used with respect to FIG. 6 refers to storing the frame buffer pixel information associated with the cluster.

If cluster one contains a pixel which overlaps with a pixel in cluster two and the corresponding frame buffer pixel is modified by pipeline one in time interval 646, a read before write hazard exists because pipeline 620 reads cluster two information which includes information related to cluster one before pipeline 610 stores cluster one information in frame buffer 410. Similarly a read-before-write hazard exists if pipeline 630 reads cluster three information before pipeline 610 stores cluster one information during interval 646. Thus for the embodiment illustrated in FIG. 6, to avoid these hazards clusterizer 340 must insure that no overlapping pixels are in consecutive clusters and overlapping pixels are not in clusters separated by only one cluster. A technique to avoid intercluster hazards using null clusters is explained in detail below.

Null clusters contain no valid data and can be processed very quickly during back end processing. For example, (see FIG. 6) if the current pixel overlaps with a pixel in Cluster one, clusterizer 630 make cluster two and cluster three into null clusters and place the current pixel into cluster four which has no hazard with cluster one, because cluster one information is stored before cluster four information is read. In some embodiments of clusterizer 340, the structure of a cluster, the granularity of memory system 105, or the granularity of fast memory unit 106 may cause an additional hazard, which should be avoided. Specifically, if the granularity of memory system 105 is a group of pixels, i.e. in any memory access to memory system 105 a group of pixels is stored or read simultaneously, group overlap creates hazards. A common cause of group access occurs if a single data word of frame buffer 410 can contain several pixels. For example if a data word in frame buffer 410 is 72 bits wide and a pixel only requires 18 bits to store the Z coordinate of the pixel, a single access to frame buffer 410 can read or write four pixels worth of information.

An intercluster group hazard can occur if cluster one contains a first pixel in group one, cluster two contains a second pixel in group one, and all accesses to frame buffer 410 results in reading or writing all of the pixels in a group. If cluster two information is read before cluster one information is stored, a read before write hazard occurs if the first pixel of group one was to be modified.

Figure 7:
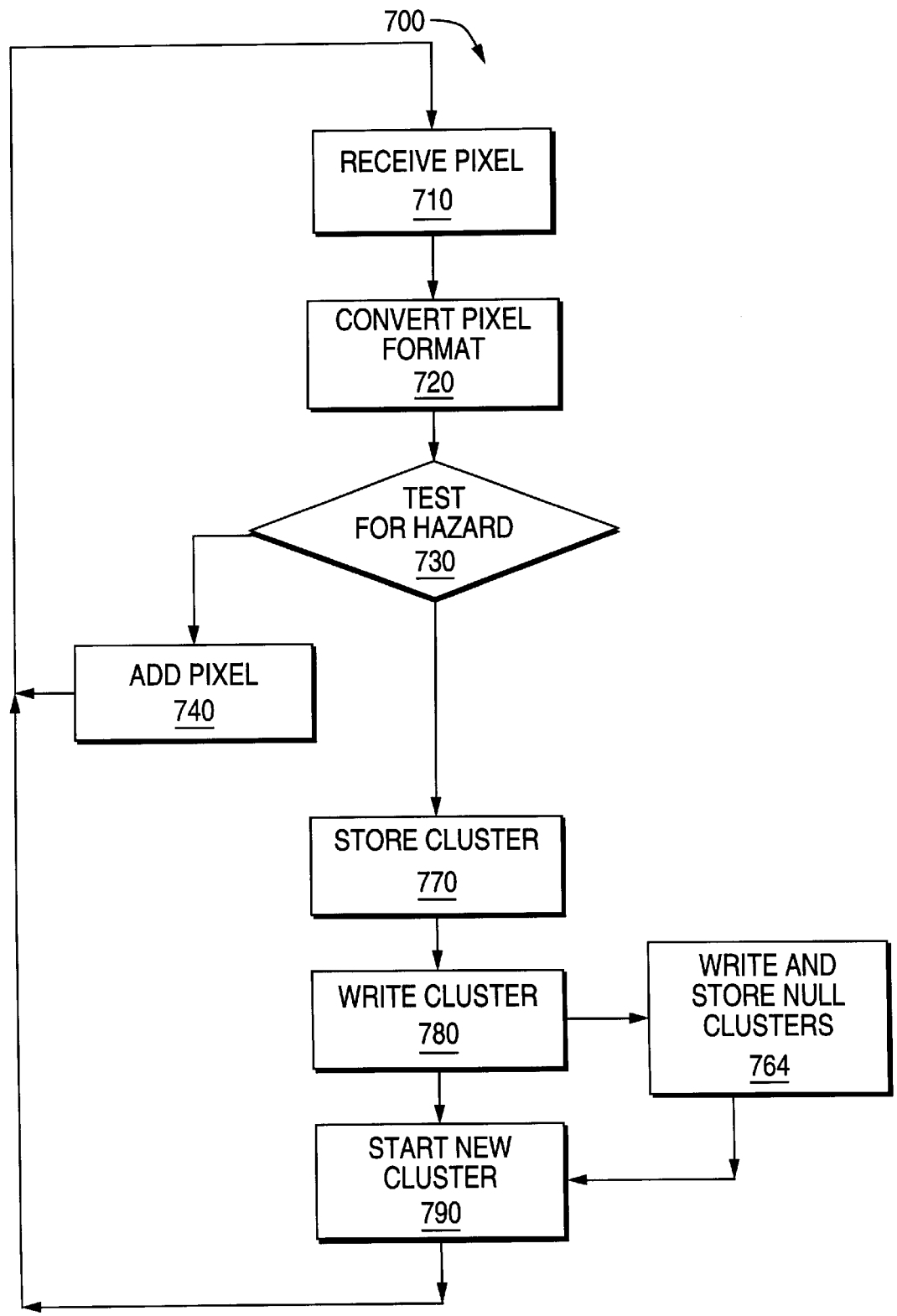
FIG. 7 shows a flow chart for a clusterizer in accordance with one embodiment of the present invention.

FIG. 7, summarizes the major functions of clusterizer 340 in a flowchart 700. Clusterizer 340 receives the current pixel from 3-D pipeline 320 in RECEIVE PIXEL 710. Clusterizer 340 converts the current pixel to a format compatible with the cluster format in CONVERT PIXEL FORMAT 720. Cluster formats can vary. A specific cluster format is described below in detail. In addition, clusterizer 340 converts the x and y coordinate of the pixel into a page addresses and a pixel/group address in CONVERT PIXEL FORMAT 720. Next, clusterizer 340 must test for potential hazards, in TEST FOR HAZARDS 730. If no potential hazards are detected and the current cluster is not full, clusterizer 340 adds the pixel to the current cluster in ADD PIXEL 740. Clusterizer 340 then waits for another pixel in RECEIVE PIXEL 710.

As explained above with respect to FIG. 6, if the back end processor interleaves clusters, the current pixel may have potential hazards with the current cluster as well as with one or more previous clusters. For example, for three level of interleaving, as in FIG. 6, the current pixel may have potential hazards with the current cluster, the first previous cluster, and the second previous cluster, i.e. the cluster immediately before the previous cluster. Assuming the back end processor uses $P_{ipe}$ pipelines, than clusterizer 340 must detect potential hazards with the current cluster and the previous $P_{ipe}$-1 clusters.

If a potential hazard exists with the earliest relevant previous cluster (ERP cluster), i.e. the ($P_{ipe}$-1)th previous cluster, the current pixel can not be placed in the current cluster. Therefore, clusterizer 340 stores the current cluster for future hazard detection in STORE CLUSTER 770. The current cluster is also written out of clusterizer 340 in WRITE CLUSTER 780. A new cluster containing the current pixel is created in START NEW CLUSTER 790. The new cluster becomes the current cluster and clusterizer 340 then waits for another pixel in RECEIVE PIXEL 710.

If a potential hazard is detected between the current pixel and the current cluster or one of the $P_{ipe}$-2 previous clusters in TEST FOR HAZARDS 730, the current pixel can not be placed in the current cluster. Therefore, clusterizer 340 stores the current cluster for future hazard detection in STORE CLUSTER 770. The current cluster is also written out of clusterizer 340 in WRITE CLUSTER 780. Clusterizer 340 then inserts null clusters to space out the current pixel from the hazard causing previous cluster.

Specifically, if a potential hazard exists with the current cluster, clusterizer 340 must write and store $P_{ipe}$-1 null clusters in WRITE and STORE NULL CLUSTERS 764. For clarity, assume the recent previous clusters up to the ERP cluster are numbered from 1 to $P_{ipe}$-1. If the current pixel has a potential hazard with previous cluster number, $PC_H$, then clusterizer 340 must write and store $P_{ipe}$-1-$PC_h$ null clusters in WRITE AND STORE NULL CLUSTERS 764. After writing and storing the necessary number of null clusters, clusterizer 340 starts a new cluster containing the current pixel in START NEW CLUSTER 790. The new cluster becomes the current cluster and clusterizer 340 then waits for another pixel in RECEIVE PIXEL 710.

In many situations the current pixel can not fit into the current cluster due to problems other than potential hazards. For example, if the current pixel is on a different memory page, the current pixel has different control parameters than the pixels in the current cluster, or the current cluster does not have space for the current pixel then the current pixel can not be placed in the current cluster eventhough no potential hazards exists. In such a situation, clusterizer 340 stores the current cluster for future intercluster hazard detection in STORE CLUSTER 770. The current cluster is also written out of clusterizer 340 in WRITE CLUSTER 780. A new cluster containing the current pixel is created in START NEW CLUSTER 790. The new cluster becomes the current cluster and clusterizer 340 then waits for another pixel in RECEIVE PIXEL 710.

FIG. 7 describes embodiments of clusterizer 340 in which only one cluster is created at a time. However, some embodiments of clusterizer 340 may try and build multiple clusters simultaneously. Using multiple clusters may lead to better utilization of the back end processor. However to benefit from better utilization of the back end processor, clusterizer 340 should provide clusters at a rate equal to or exceeding the rate that the back end processor can process clusters.

Figure 8:
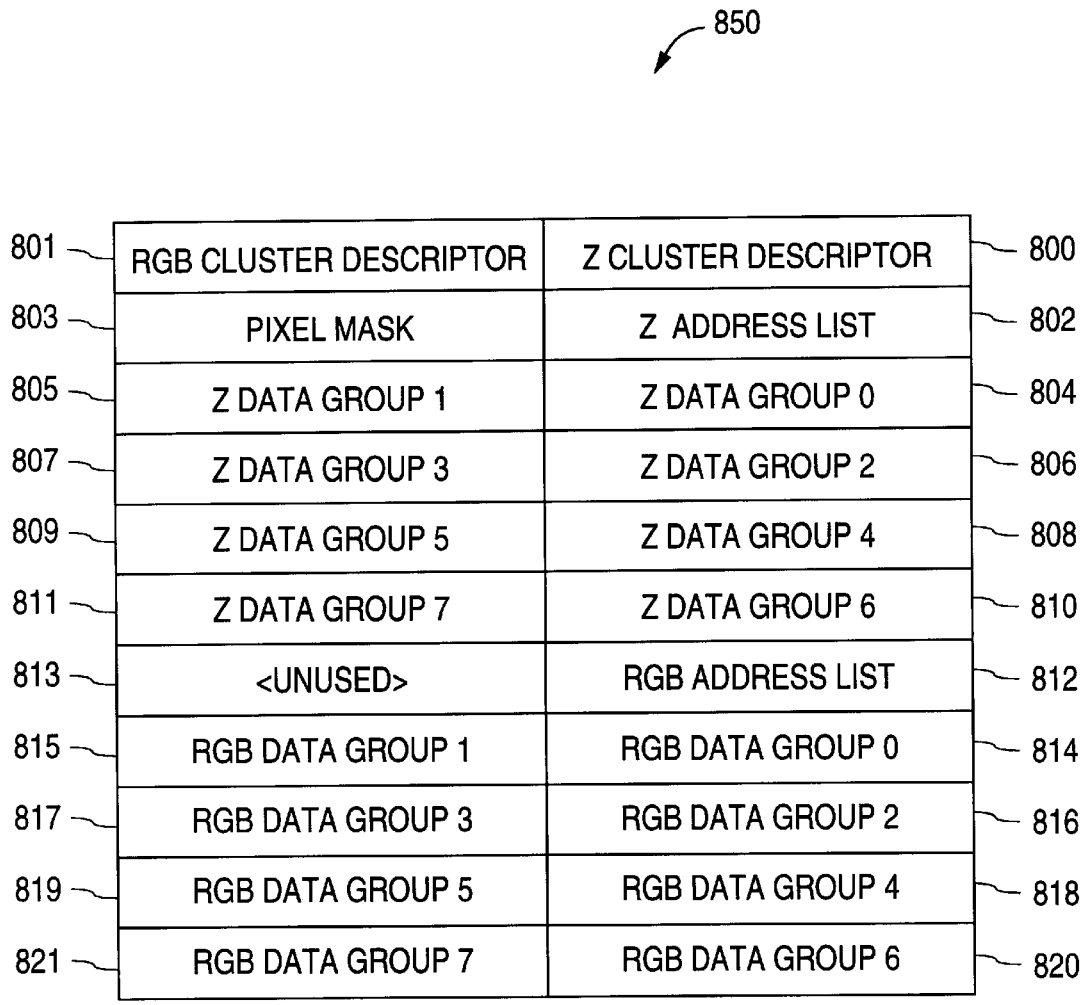
FIG. 8 shows a cluster format for use with one embodiment of the present invention.

As explained above, cluster formats can vary. FIG. 8 illustrates a specific cluster format 850 for use with media processor 110B (FIG. 2), which uses Rambus DRAMs in memory system 105. Each data word in cluster format 850 is 72 bits wide. In this embodiment of clusterizer 340, the Z coordinate of a pixel is only 18 bits; therefore, each data word can contain a group of up to four pixels. The number of pixels per group may be limited by the size of the ARGB (Alpha, Red, Green Blue) information about a pixel. Common formats of ARGB take 8 bits, 18 bits, or 32 bits. In 8 bit or 18 bit ARGB format, the Z coordinate size limits a group to four pixels; however, in 32 bit ARGB format, the ARGB size limits a group to two pixels.

Cluster format 850 is a fixed size format with 22 data words and can contain z-coordinates and color space information for up to eight groups of pixels. Even null clusters which contain no useful pixel information are 22 data words long. Fixed size cluster formats offer the advantage of consistency for back end processing. Other cluster formats can support clusters of varying length, but whatever back end processor used to perform Z-buffering and alpha blending must support the variable length.

Cluster format 850 includes a Z cluster descriptor in data word 800 and an RGB cluster descriptor in data word 801. The Z cluster descriptor contains the number of data words which contain valid pixel information, the logical memory address of the memory page for the pixels in the cluster, the number of bytes of valid data words, control parameters for the cluster, and an indication of whether the cluster is a null cluster. The RGB cluster descriptor in data word 801 contains similar information for the ARGB information of the pixels in the cluster.

The Z address list in data word 802 contains the Z coordinate group offset address for each group of pixels. In the embodiment of clusterizer 340 using cluster format 850, the page size of a memory page is 256. Therefore, one byte is needed to store the group address for each group of pixels in the cluster. The pixel mask in data word 803 is used to indicate which pixels in the 8 groups of pixels actually contain valid pixels. A simple 1 bit indicator for each pixel is used. Since the maximum number of pixels is 32 only 32 one bit flags are needed in the pixel mask. The pixel mask may be repeated twice in data word 803 to facilitate functions requiring bit rotation in a data word. Each of data words 804 to 811 can contain Z coordinates for a group of pixels the cluster. The embodiment of memory system 105 in FIG. 2 has two banks of RDRAMs. RDRAM bank 205a is configured for odd data word addresses and RDRAM bank 205b is configured for even data word addresses. Since a group of pixel is typically one data word, embodiments of clusterizer 340 used with dual bank memory systems have odd and even groups of pixels. Odd groups of pixels can only be stored in the odd data words of cluster 850. Even groups of pixels can only be stored in even data words of cluster 850.

Data word 812 contains an RGB Address list, which contains the color space group address for each group of pixels in the cluster. Each of data word 814 to 821 can contain color space information for a group of pixels the cluster.

Figure 9:
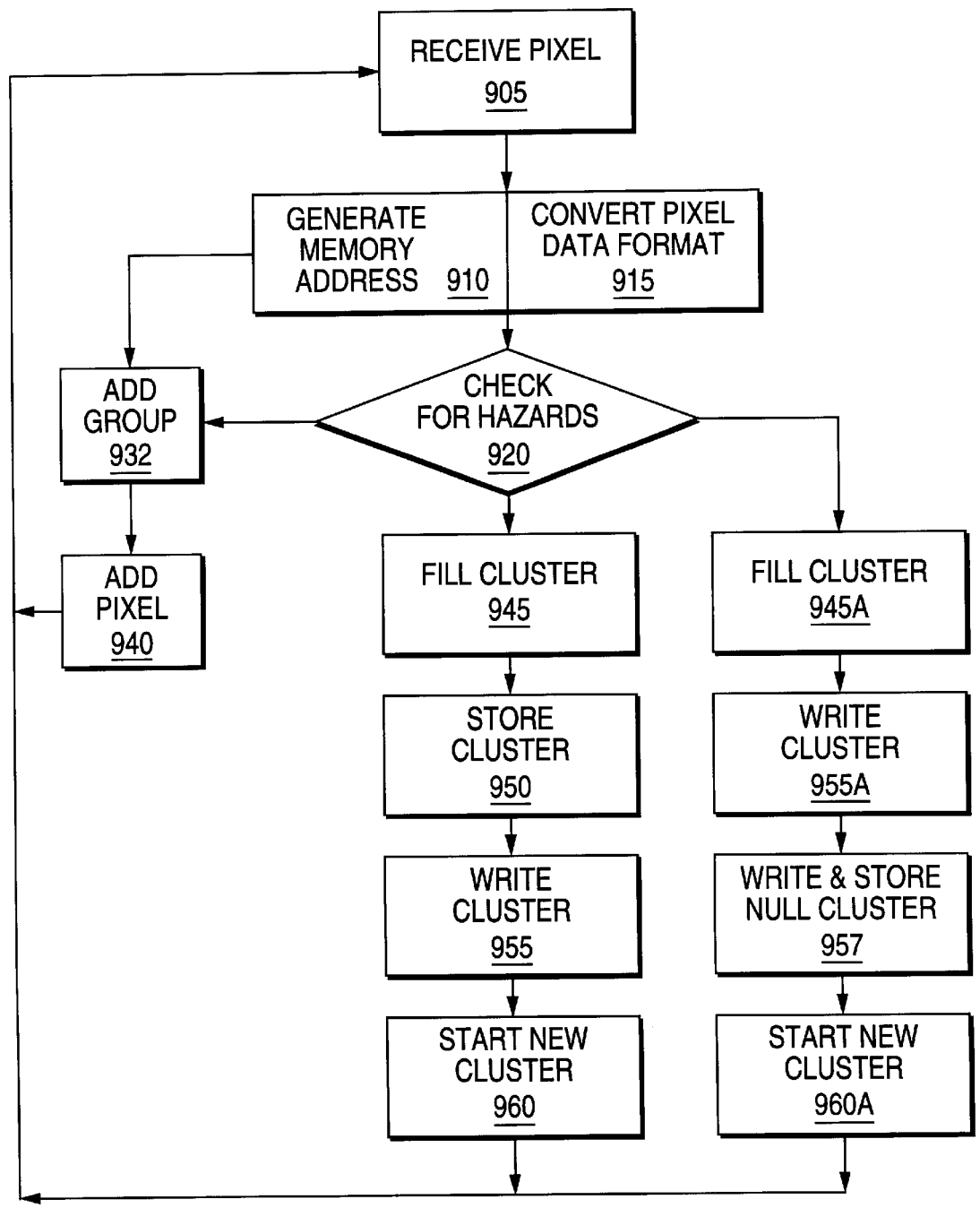
FIG. 9 shows a detailed flow chart for a clusterizer in accordance with one embodiment of the present invention.

FIG. 9 provides a detailed flowchart describing an embodiment of clusterizer 340 using cluster format 850 with a two pipeline back end processor. In the description which follows, the current cluster is the cluster being generated by clusterizer 340 and the previous cluster is the cluster which was most recently written into fast memory system 106 by clusterizer 340. When only two pipelines are used in the back end processor, intercluster hazards only appear in temporally adjacent clusters. Thus, the embodiment of clusterizer 340 described by FIG. 9 need only store the previous cluster for intercluster hazard detection.

Clusterizer 340 receives the current pixel from 3-D pipeline 320 in RECEIVE PIXEL 905. Clusterizer 340 converts the data in the current pixel to a format compatible with the cluster format in CONVERT PIXEL FORMAT 915. In addition, clusterizer 340 converts the x and y coordinate of the pixel into a page addresses and a pixel/group address in GENERATE MEMORY ADDRESS 910. GENERATE MEMORY ADDRESS 910 and CONVERT PIXEL FORMAT 915 can be processed simultaneously to increase the speed of clusterizer 340. Although the page address and group address may differ for Z-coordinates and the color space information, only the most restrictive set of page address is necessary for clusterization. Color space information for a pixel may be one byte, two bytes, or four bytes long, whereas the Z coordinate is typically defined to be two bytes. Thus, if a page of memory can store the Z-coordinates of $Z_{page}$ pixels, the same size memory page can hold color space information for $2*Z_{page}$, $Z_{page}$, or $0.5*Z_{page}$ pixels for one byte, two byte, or four byte color space information, respectively. If only one byte color space information is used the Z-coordinate page address is more restrictive because a page of memory holds the color space information of more pixels than same size page can hold of Z-coordinates. If two byte color space is used both the Z-coordinate page address and the color space page address are equally restrictive. Conversely, if four byte color space is used, the color space page address is more restrictive than the Z-coordinate page address.

When clusterizer 340 is reset or first powered up the current cluster contains no pixels. Furthermore, no previous cluster exists. Therefore, on the first pixel after power up or reset, clusterizer 340 can add the current pixel without checking for hazards in CHECK FOR HAZARDS 920. Specifically, clusterizer 340 stores the page address and control parameters of the current pixel in the current cluster.

Clusterizer 340 also adds the group Z address to an empty slot in Z address list (FIG. 8) and the group color space address to an empty slot in the RGB Address list in ADD GROUP 932. Then the Z coordinate and color space information of the current pixel is placed in the appropriate pixel location of the data words in the current cluster in ADD PIXEL 940. The pixel mask of the current cluster is also updated to reflect the added pixel. Clusterizer 340 then waits for the next pixel in receive pixel 905.

For other pixels, clusterizer 340 checks for clustering problems and potential hazards between the current pixel and the current cluster and between the current pixel and the previous cluster in CHECK FOR HAZARDS 920. As explained above clustering problems include (1) the page address of the current pixel being different from the page address of the pixels in the cluster; (2) the control parameters of the current pixel being different form the control parameters of the current cluster; and (3) the current cluster not having room for the current pixel.

The current pixel has a potential hazard with the current cluster if: (1) the current pixel and the current cluster have a common page address and (2) the group address of the current pixel matches a group address of a group already in the current cluster and the pixel location for the current pixel is already used in the matching group, as indicated by the pixel mask of the current cluster. The comparison of the group addresses can be implemented using a content addressable memory to improve the speed of the comparisons. For embodiments of clusterizer 340 using even and odd groups, a potential hazards exist only if the current pixel belongs in an odd group and the group address of the current pixel matches the group address of an odd group in the current cluster. Similarly, if the current pixel belongs in an even group, a potential hazard exists only if the group address of the current pixel matches the group address of an even group in the current cluster.

The current pixel has a potential hazard with the previous cluster if: (1) the current pixel and the previous cluster have a common page address and (2) the group address of the current pixel matches a group address of a group already in the current cluster. The comparison of the group addresses can be implemented using a content addressable memory to improve the speed of the comparisons. For embodiments of clusterizer 340 using even and odd groups, a potential hazards exists only if the current pixel belongs in an odd group and the group address of the current pixel matches the group address of an odd group in the previous cluster. Similarly, if the current pixel belongs in an even group, a potential hazard exists only if the group address of the current pixel matches the group address of an even group in the previous cluster.

After clusterizer 340 determines the problems and potential hazards with regard to the current pixel, clusterizer 340 can take one of three actions: (1) add the current pixel to the current cluster (ADD), (2) terminate the current cluster and start a new cluster containing the current pixel (TERM), or (3) terminate the current cluster, send a null cluster, and start a new cluster containing the current pixel (NULL). Each action is included in FIG. 9 and described below. TABLE 2 provides an action table based on the problems and potential hazards detected in CHECK FOR HAZARDS 920. In TABLE 2 "——" is used to indicate the answer to this column can be Yes or No without affecting the action taken by clusterizer 340.

TABLE 2

| Same Page ADDR? | Current Cluster Hazard? | Same CNTRL Param? | Space in Current? | Previous Cluster Hazard | ACTION |
|---|---|---|---|---|---|
| N | — | — | — | — | TERM |
| Y | Y | — | — | — | NULL |
| Y | N | N | — | — | TERM |
| Y | N | Y | N | — | TERM |
| Y | N | Y | Y | N | ADD |
| Y | N | Y | Y | Y | TERM |

Thus, if the page address of the current pixel is not the same as the pixel address of the pixels in the current cluster, clusterizer 340 terminates the current pixel and starts a new cluster containing the current pixel regardless of other problems or potential hazards.

If the page address of the current pixel matches the page address of the pixels in the current cluster and a potential hazard exists between the current pixel and the current cluster; clusterizer 340 terminates the current cluster, sends a null cluster and starts a new cluster containing the current pixel.

If the page address of the current pixel matches the page address of the pixels in the current cluster, a potential hazard does not exist between the current pixel and the current cluster, and the control parameters of the current pixel do not match the control parameters of the pixels in the current cluster; clusterizer 340 terminates the current pixel and starts a new cluster containing the current pixel.

If the page address of the current pixel matches the page address of the pixels in the current cluster, a potential hazard does not exist between the current pixel and the current cluster, the control parameters of the current pixel match the control parameters of the pixels in the current cluster, and the current cluster does not have space for the current pixel; clusterizer 340 terminates the current pixel and starts a new cluster containing the current pixel.

If the page address of the current pixel matches the page address of the pixels in the current cluster, a potential hazard does not exist between the current pixel and the current cluster, the control parameters of the current pixel match the control parameters of the pixels in the current cluster, the current cluster has space for the current pixel in the current cluster, and a potential hazard does not exist between the current pixel and the previous cluster; clusterizer 340 adds the current pixel to the current cluster.

If the page address of the current pixel matches the page address of the pixels in the current cluster, a potential hazard does not exist between the current pixel and the current cluster, the control parameters of the current pixel match the control parameters of the pixels in the current cluster, the current cluster has space for the current pixel in the current cluster, and a potential hazard does exist between the current pixel and the previous cluster; clusterizer 340 terminates the current pixel and starts a new cluster containing the current pixel.

Returning to FIG. 9, if clusterizer 340 is adding the current pixel to the current cluster (i.e. action ADD), clusterizer 340 determines if the group of the current pixel is already in the current cluster in ADD GROUP 932. If the group of the current pixel is not in the current cluster, clusterizer 340 adds the group Z address to an empty slot in Z address list (FIG. 8) and the group color space address to an empty slot in the RGB Address list. Then the Z coordinate and color space information of the current pixel is placed in the appropriate pixel location of the data words in the current cluster in ADD PIXEL 940. The pixel mask of the current cluster is also updated to reflect the added pixel. Clusterizer 340 then waits for the next pixel in receive pixel 905.

If clusterizer 340 terminate the current cluster and starts a new cluster containing the current pixel (i.e. action TERM), clusterizer 340 first fills the Z address list and RGB address list with fill addresses that do not cause hazards in FILL CLUSTER 945. Specifically, the fill addresses must not match group addresses from the previous cluster or valid group addresses in the current cluster. Filling the addresses prevents removes the invalid group addresses from the cluster and eliminates potential hazards that may result from the unchecked invalid addresses. If even and odd groups are used by clusterizer 340, the even filled addresses only need to be different from the even group address of the previous cluster and the valid even group addresses of the current cluster. Similarly, the odd filled addresses only need to be different from the odd group address of the previous cluster and the valid odd group addresses of the current cluster. Filling of clusters is optional depending on the implementation of the back end processor used with clusterizer 340. If the back end processor reads and writes all the data words in a cluster whether the data word contains new pixel information then filling should be performed. For example, in one embodiment of back end processor 480, all pixels in a cluster are read and written during Z-buffering but only valid groups as indicated by the Z cluster descriptor are modified. A circuit to generate non-hazardous fill addresses for use with cluster format 850 using even and odd groups is described below with respect to FIGS. 10(a)–10(d).

Clusterizer 340 stores the current cluster as the previous cluster in STORE CLUSTER 950. The previous cluster is necessary to detect potential hazards. After storing the terminated cluster, clusterizer 340 writes the terminated cluster to fast memory unit 106 (FIG. 4) in WRITE CLUSTER 955. Clusterizer 340 then starts a new cluster containing the current pixel as the new current cluster in START NEW CLUSTER 960. Specifically, clusterizer 340 stores the page address and control parameters of the current pixel in the new current cluster. Clusterizer 340 also adds the group Z address to an empty slot in Z address list (FIG. 8) and the group color space address to an empty slot in the RGB Address list Then the Z coordinate and color space information of the current pixel is placed in the appropriate pixel location of the data words in the new current cluster. The pixel mask of the new current cluster is also updated to reflect the current pixel. Clusterizer 340 then waits for the next pixel in receive pixel 905.

IF clusterizer 340 terminate the current cluster, send a null cluster, and start a new cluster containing the current pixel (i.e. action NULL), clusterizer 340 first fills the Z address list and RGB address list with group addresses that do not cause hazards in FILL CLUSTER 945A as explained above with respect to FILL CLUSTER 945. Fill CLUSTER 945A, WRITE CLUSTER 955A, and START NEW CLUSTER 960A are drawn in FIG. 9 to more clearly explain the three actions clusterizer 340 may take after CHECK FOR HAZARD 920. In actual implementation hardware for only one FILL CLUSTER stage, one WRITE CLUSTER stage, and one START NEW CLUSTER stage is necessary.

Since clusterizer 340 must write a null cluster after the current cluster, the current cluster does not need to be stored in clusterizer 340. However, clusterizer 340 still must write the current cluster to fast memory unit 106 (FIG. 4) in WRITE CLUSTER 955A. Clusterizer 340 then writes a null cluster and stores a null cluster as the previous cluster in WRITE & STORE NULL CLUSTER 957. The null cluster is inserted to prevent a hazard between the current pixel and the current cluster. Clusterizer 340 then starts a new cluster containing the current pixel as the new current cluster in START NEW CLUSTER 960A as described above with respect to START NEW CLUSTER 960.

As explained above, each group address in the current cluster must differ from every other group address in the current cluster and every group address in the previous cluster. Therefore when clusterizer 340 is filling a cluster, clusterizer 340 must generate filled addresses which do not match the other group addresses in the current cluster or the group addresses from the previous cluster. Also as explained above, if group addresses are limited to either even data words or odd data words, then even filled addresses only need to differ from even valid addresses and odd filled address only need to differ from odd valid addresses. FIGS. 10(*a*)–10(*d*) show circuits which can be used to generate even fill addresses for an embodiment of clusterizer 340 using cluster format 850. The same circuits can be used to generate odd fill addresses by using odd valid addresses in place of odd addresses in FIGS. 10(*a*)–10(*d*). FIGS. 10(*a*)–10(*d*) are explained with reference to the Z addresses list in data word 802. If necessary the circuits of FIGS. 10(*a*)–10(*d*) can also be used to generate fill addresses for the RGB Address list in data word 812.

The circuit of FIG. 10(*a*) generates a fill address in memory circuit 1030 for the second most significant byte of the Z address list in data word 802, which would correspond to data word 810 in cluster format 850. The even group addresses of previous cluster 1010 are contained in memory circuits 1011, 1012, 1013, and 1014. The group address in memory circuit 1011, 1012, 1013, and 1014 correspond to data words 810, 808, 806, and 804, respectively, in previous cluster 1010. The group address in memory circuit 1021, 1022, 1023, and 1024 correspond to data words 810, 808, 806, and 804, respectively, in current cluster 1020. However, memory circuits 1021, 1022, 1023, and 1024 may not contain actual group addresses. When a new cluster is created, the Z address list is set to all zeros. Therefore, every bit of an invalid group address is zero.

To create a fill address in memory circuit 1030, bit 7 of memory circuit 1011 is inverted through inverter 1031 and stored in bit 7 of memory circuit 1030. Thus, the fill address being generated in memory circuit 1030 will differ from the group address in memory circuit 1011 in at least bit 7. Bit 6 of memory circuit 1012 is inverted through inverter 1032 and stored in bit 6 of memory circuit 1030. Thus, the fill address being generated in memory circuit 1030 will differ from the group address in memory circuit 1012 in at least bit 6. Bit 5 of memory circuit 1013 is inverted through inverter 1033 and stored in bit 5 of memory circuit 1030. Thus, the fill address being generated in memory circuit 1030 will differ from the group address in memory circuit 1013 in at least bit 5. Bit 4 of memory circuit 1014 is inverted through inverter 1034 and stored in bit 4 of memory circuit 1030. Thus, the fill address being generated in memory circuit 1030 will differ from the group address in memory circuit 1014 in at least bit 4.

Bit 3 of memory circuit 1021 is stored in bit 3 of memory circuit 1030. Memory circuit 1021 corresponds to the invalid group address that the fill address being generated in memory circuit 1030 is destined to replace. As explained above, every bit of every invalid group addresses is zero. By not inverting the bit from the memory circuit which the fill address is being generated to replace, multiple fill addresses will also differ from each other. This concept is explained below with the example of TABLE 3.

Bit 2 of memory circuit 1022 is inverted by inverter 1036 and stored in bit 2 of memory circuit 1030. Bit 1 of memory circuit 1023 is inverted by inverter 1037 and stored in bit 1 of memory circuit 1030. Bit 0 of memory circuit 1024 is inverted by inverter 1038 and stored in bit 0 of memory circuit 1030. Thus, the fill address generated in memory circuit 1030 differs from each address in memory circuits 1011, 1012, 1013, 1014, 1022, 1023, and 1024 in at least one bit position. Since the fill address generated in memory circuit is to replace the address in memory circuit 1021, the fill address need not differ from the address in memory circuit 1021.

The circuit of FIG. 10(*b*) generates a fill address in memory circuit 1040 for data word 808 in cluster format 850. Since, the circuit of FIG. 10(*b*) is similar to the circuit of FIG. 10(*a*) only the differences are described. Specifically, bit 3 of memory circuit 1021 is inverted through inverter 1035 and stored in bit 3 of memory circuit 1040. However, bit 2 of memory circuit 1022 is stored in bit 2 of memory circuit 1040 without inverting.

The circuit of FIG. 10(*c*) generates a fill address in memory circuit 1050 for data word 806 in cluster format 850. Since, the circuit of FIG. 10(*c*) is similar to the circuit of FIG. 10(*a*) only the differences are described. Specifically, bit 3 of memory circuit 1021 is inverted through inverter 1035 and stored in bit 3 of memory circuit 1040. However, bit 1 of memory circuit 1023 is stored in bit 1 of memory circuit 1040 without inverting.

The circuit of FIG. 10(*d*) generates a fill address in memory circuit 1040 for data word 808 in cluster format 850. Since, the circuit of FIG. 10(*d*) is similar to the circuit of FIG. 10(*a*) only the differences are described. Specifically, bit 3 of memory circuit 1021 is inverted through inverter 1035 and stored in bit 3 of memory circuit 1040. However, bit 0 of memory circuit 1024 is stored in bit 0 of memory circuit 1040 without inverting.

TABLE 3 provides an example to further clarify the circuits of FIGS. 10(*a*)–10(*d*)

TABLE 3

| Memory Circuit | Valid? | Value |
| --- | --- | --- |
| 1011 | Y | 11001100 |
| 1012 | Y | 10101010 |
| 1013 | Y | 11101011 |
| 1014 | Y | 00101101 |
| 1021 | Y | 00011000 |
| 1022 | N | 00000000 |
| 1023 | N | 000Q0G00 |
| 1024 | Y | 101000010 |
| 1040 |  | 01010011 |
| 1050 |  | 01011101 |

In the example of TABLE 3, fill addresses only need to be generated for memory circuit 1040 and memory circuit 1050. The fill address for memory circuit 1040 differs from the fill address of memory circuit 1050 as is desired for back end processing. Had bit 2 of memory circuit 1040 and bit 1 of memory circuit 1050 been inverted, the resulting fill address for both memory circuit 1040 and memory circuit 1050 would be 01011111. Which may create a potential hazard. By not inverting the bit from the memory circuit a fill address is to replace, uniqueness of the fill addresses is maintained.

Fill addresses can be generated with many different circuits. The circuits of FIGS. 10(*a*)–10(*d*) are merely one embodiment of these circuits. Conceptually, the circuits of FIGS. 10(*a*)–10(*d*) perform as desired by creating a fill address that differs from each valid address in at least one position. Furthermore, the bit position of the difference differs for each valid group address.

Figure 11:
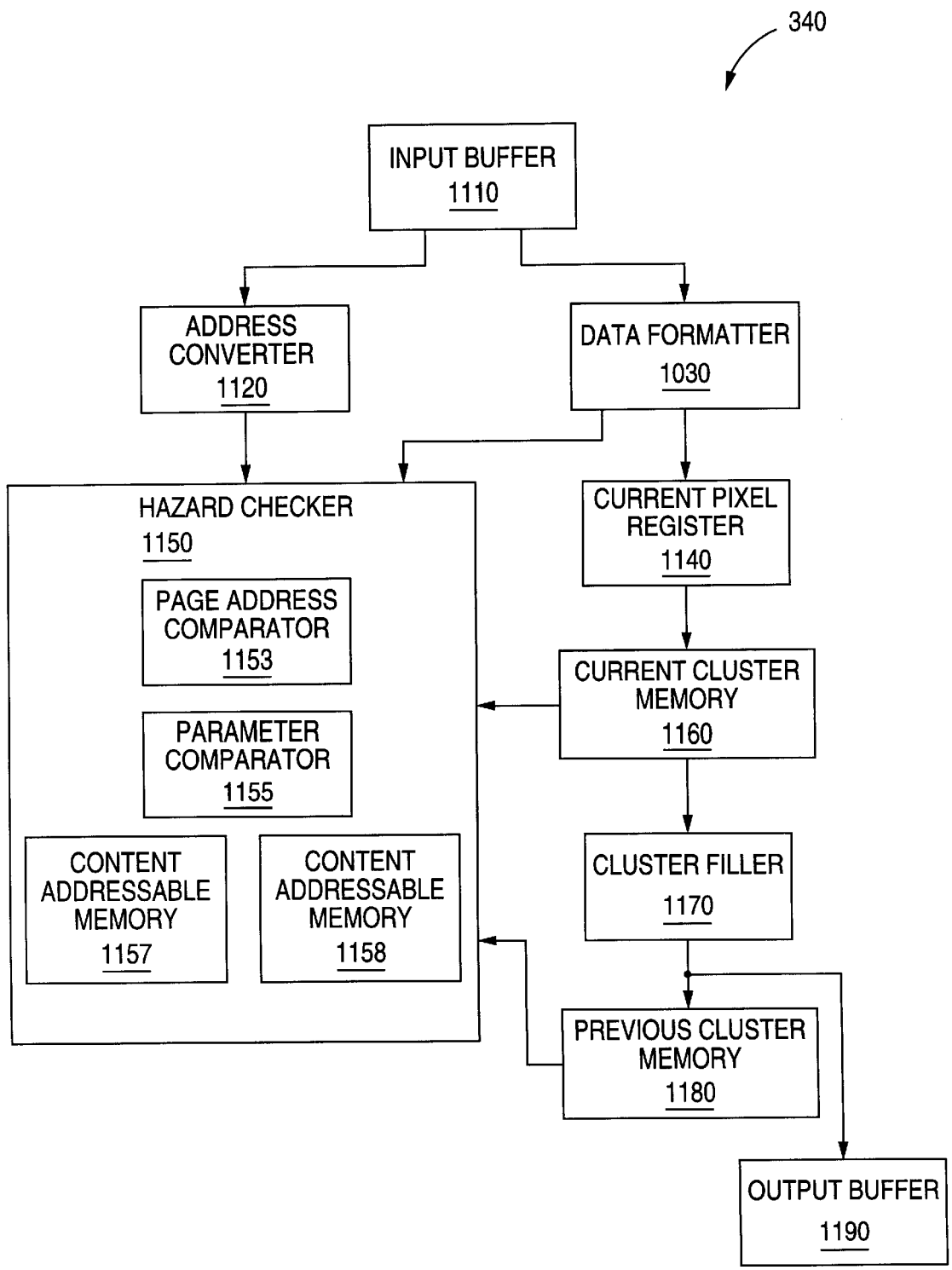
FIG. 11 is a block diagram of a clusterizer in accordance with one embodiment of the present invention.

FIG. 11 is a block diagram of an embodiment of clusterizer 340 performing the functions described by the flow chart of FIG. 9. An input buffer 1110 receives pixels from 3-D pipeline 320. An address converter 1120 is coupled to input buffer 1110 to receive the x and y coordinate of each pixel. Address converter 1120 calculates the page address, group offset, and pixel location of each pixel.

A data formatter 1130 is coupled to input buffer 1110 various pixel information such as color space information, the z coordinate, and control parameters of each pixel. Data formatter 1130 converts the information from raw pixel format to cluster format. The cluster formatted pixel information is stored in a current pixel register 1140.

A hazard checker 1150 receives the page address, group address, and pixel location of each pixel from address converter 1120 as well as control parameters of each pixel from data formatter 1130. Hazard checker 1150 detects potential hazards and problems between the current pixel and the current cluster as well as between the current pixel and the previous cluster. Specifically, a page address comparator 1153 compares the page address from address converter 1120 with a page address value in current cluster memory 1160 and previous cluster memory 1180.Similarly, a parameter comparator 1155 compares the control parameters from data formatter 1130 with the control parameters from current cluster memory 1160. A content addressable memory 1157 determines if a group address from address converter 1120 matches a group address from current cluster memory 1160. Similarly a content addressable memory 1157 determines if a group address from address converter 1120 matches a group address from previous cluster memory 1180.

If no potential hazards are detected by hazard detector 1150, the information from current pixel register 1140 are written into current cluster memory 1160 as described above. If a hazard is detected, the contents of current cluster memory 1160 are supplemented by cluster filler 1170. The supplemented cluster from cluster filler 1170 is stored in previous cluster memory 1180 and written out of clusterizer 1180 through output buffer 1190.

In the various embodiments of this invention, methods and structures have been described that eliminate that reduces the complexity of back end processing for 3-D graphics. By gathering pixels into clusters which are easily processed and free of pipelining hazards, a 3-D graphic system can use a programmable back end processor with a hardware 3-D pipeline. Thus a 3-D graphic system in accordance with the present invention can provide low cost flexible software based back end processing without sacrificing throughput.

The various embodiments of the structures and methods of this invention that are described above are illustrative only of the principles of this invention and are not intended to limit the scope of the invention to the particular embodiments described. In view of this disclosure, those skilled-in-the-art can define other back end processors, busses, processors, 3-D pipelines, cluster formats, media processors, fast memory units, memory systems, clusterizers, cluster fillers, frame buffers, setup processors, tiles, pipelines, features to create a method, circuit, or system according to the principles of this invention.

I claim:

1. A method for processing polygons for 3-D graphics, said method comprising:

receiving a plurality of vertices of said polygons;
generating a parameter list for each of said polygons;
from said parameter lists, rasterizing said polygons into a plurality of pixels using a 3-D pipeline;
organizing said pixels into a plurality of clusters to allow pixels in each of said clusters to be processed under a common operation; and
performing Z-buffering and blending operations on said clusters.

2. The method of claim 1, wherein said generating is carried out on a SIMD processor.

3. The method of claim 2, wherein said said performing is carried out on said SIMD processor.

4. The method of claim 1, wherein said clusters are organized to allow parallel processing, such that common pixels in two clusters are not processed simultaneously.

5. The method of claim 1, further comprising retrieving said polygons from a fast memory unit.

6. The method of claim 1, further comprising:
retrieving said polygons from a fast memory unit;
storing said clusters in said fast memory unit; and
retrieving said clusters from said fast memory unit.

7. A 3-D graphics system comprising:
a fast memory unit;
a setup processor coupled to said fast memory unit and configured to generate a parameter list for each of a plurality of polygons;
a 3-D pipeline coupled to said fast memory unit and configured to rasterize said polygons to create a plurality of pixels, in accordance with said parameter lists;
a clusterizer, said clusterizer organizing said plurality of pixels to allow pixels in each cluster to be processed under a common operation; and
a back end processor coupled to said fast memory unit and configured to perform Z-buffering and blending operations on said pixels.

8. The 3-D graphics system of claim 7, further comprising a memory system coupled to said fast memory unit.

9. The 3-D graphics system of claim 8, wherein said memory system includes a frame buffer for storing said pixels.

10. The 3-D graphics system of claim 9, wherein said memory system also stores software code.

11. The 3-D graphics system of claim 1, coupled to a host computer through a host bus.

12. A method to group a plurality of rasterized pixels into clusters for hazard-free processing, said method comprising:
selecting a current pixel from said plurality of pixels;
checking for potential hazards between a current cluster and said current pixel;
adding said current pixel to said current cluster if said current pixel is subject to a common operation as pixels in said current cluster and if no potential hazards are found.

13. The method of claim 12, further comprising generating a page address and a group address for said current pixel.

14. The method of claim 13, wherein checking for potential hazards between a current cluster and said current pixel comprises:
comparing said page address of said current pixel to a current cluster page address of pixels in said current cluster; and
comparing said group address of said current pixel with current cluster group addresses of pixels in said current cluster.

15. The method of claim 14, wherein checking for potential hazards between a current cluster and said current pixel further comprises comparing control parameters from said current pixel with current cluster control parameters of pixels in said current cluster.

16. The method of claim 12 further comprising outputting said current cluster if any of said potential hazards is detected; and starting a new cluster with said current pixel if any of said potential hazards is detected.

17. The method of claim 16 further comprising filling said current cluster with one or more fill addresses before outputting said current cluster if said current cluster is not full.

18. The method of claim 12, further comprising checking for potential hazards between a previous cluster and said current pixel.

19. The method of claim 18, further comprising outputting said current cluster if any of said potential hazards is detected between said current pixel and said previous cluster; and starting a new cluster with said current pixel if any of said potential hazards is detected between said current pixel and said previous cluster.

20. The method of claim 19, further comprising:

outputting said current cluster if any of said potential hazards is detected between said current pixel and said current cluster;

outputting a null cluster if any of said potential hazards is detected between said current pixel and said current cluster; and starting a new cluster with said current pixel if any of said potential hazards is detected between said current pixel and said current cluster.

21. A clusterizer configured to receive a plurality of pixels and clusterize said pixels into plurality of clusters, said clusterizer comprising:

an input buffer to receive said pixels;

a cluster organizer coupled to receive said pixels from said input buffer, said cluster organizer organizing said pixels into said clusters to allow pixels in each cluster to be processed under a common operation;

an address converter coupled to said cluster organizer;

a data formatter coupled to said cluster organizer;

a hazard checker coupled to said address converter;

a current cluster memory circuit coupled to said data formatter and to said hazard checker; and an output buffer coupled to said current cluster memory circuit.

22. The clusterizer of claim 21, wherein said address converter converts an x and y coordinate of each pixel to a page address and a group address for each pixel;

said data formatter converts data from a pixel format to a cluster format; and said hazard checker detects hazards between said a current pixel and a current cluster stored in said current cluster memory.

23. The clusterizer of claim 21, wherein said hazard checker further comprises:

a page address comparator coupled to said address converter and said current cluster memory;

a parameter comparator coupled to said data formatter and said current cluster memory;

and a content addressable memory coupled to said address converter.

24. The clusterizer of claim 21, further comprising:

a cluster filler coupled between said current cluster memory and said output buffer; and a previous cluster memory coupled to said cluster filler.

25. The clusterizer of claim 24, wherein said cluster filler generates fill addresses which differ from group address in said current cluster memory.

* * * * *